US012694493B2

(12) United States Patent
Nagata

(10) Patent No.: US 12,694,493 B2
(45) Date of Patent:  Jul. 28, 2026

(54) DISPLAY CONTROL APPARATUS, DISPLAY CONTROL METHOD, RECORDING MEDIUM, AND DISPLAY SYSTEM THAT CORRECTS DISTORTION BASED ON VIEWPOINT INFORMATION AND A DISPLAY POSITION

(71) Applicant: Sony Group Corporation, Tokyo (JP)

(72) Inventor: Koji Nagata, Tokyo (JP)

(73) Assignee: Sony Group Corporation, Tokyo (JP)

( * ) Notice: Subject to any disclaimer, the term of this patent is extended or adjusted under 35 U.S.C. 154(b) by 198 days.

(21) Appl. No.: 18/252,534

(22) PCT Filed: Nov. 15, 2021

(86) PCT No.: PCT/JP2021/041836
§ 371 (c)(1),
(2) Date: May 11, 2023

(87) PCT Pub. No.: WO2022/130864
PCT Pub. Date: Jun. 23, 2022

(65) Prior Publication Data
US 2024/0020803 A1     Jan. 18, 2024

(30) Foreign Application Priority Data

Dec. 16, 2020    (JP) .................................. 2020-208455

(51) Int. Cl.
*G06T 5/80* (2024.01)
*B60K 35/10* (2024.01)
(Continued)

(52) U.S. Cl.
CPC .............. *G06T 5/80* (2024.01); *B60K 35/231* (2024.01); *B60K 35/233* (2024.01);
(Continued)

(58) Field of Classification Search
CPC ...... G06T 5/80; H04N 9/3185; H04N 9/3194; G02B 27/0101; G02B 2027/0138;
(Continued)

(56) References Cited

U.S. PATENT DOCUMENTS

2019/0369396 A1    12/2019  Smith

FOREIGN PATENT DOCUMENTS

| CN | 107921871 A | 4/2018 |
| DE | 102019200632 A1 | 7/2020 |

(Continued)

OTHER PUBLICATIONS

Jp 2020-071415A (Maxell Holding Ltd) May 7, 2020, English Translation, pp. 1-10.*

(Continued)

*Primary Examiner* — Jacinta M Crawford
(74) *Attorney, Agent, or Firm* — XSENSUS LLP

(57) ABSTRACT

It is an object of the present disclosure to display an image that is optimal for each viewer. A display control apparatus includes a distortion correction selecting section that determines a display position that is a position, on a screen, at which an image of content is displayed, determines a viewer position that is a position of a viewer who views the image, and determines, according to the viewer position, transformation information used to correct the image such that a distortion in the image appears reduced to the viewer when the viewer views the image displayed at the display position on the screen; and a distortion correction processor that renders a correction image that is an image obtained by correcting the image using the transformation information to generate correction-image rendering data that is output to the display apparatus.

20 Claims, 12 Drawing Sheets

(51) Int. Cl.

| | |
|---|---|
| *B60K 35/231* | (2024.01) |
| *B60K 35/233* | (2024.01) |
| *B60K 35/235* | (2024.01) |
| *B60K 35/65* | (2024.01) |
| *B60K 35/81* | (2024.01) |
| *G09G 3/00* | (2006.01) |

(52) U.S. Cl.

CPC .......... *B60K 35/654* (2024.01); *B60K 35/656* (2024.01); *B60K 35/81* (2024.01); *G09G 3/002* (2013.01); *B60K 35/10* (2024.01); *B60K 35/235* (2024.01); *G09G 2320/028* (2013.01); *G09G 2380/10* (2013.01)

(58) Field of Classification Search

CPC ...... G02B 2027/014; G02B 2027/0187; G09G 3/002; G09G 5/38; G09G 2320/028; G09G 2340/0464; G09G 2340/12; G09G 2380/10; B60K 35/00; B60K 35/10; B60K 35/20; B60K 35/23; B60K 35/231; B60K 35/233; B60K 35/235; B60K 35/654; B60K 35/656; B60K 35/81; B60K 2360/741; B60K 2360/785

USPC ................................................ 345/419, 647

See application file for complete search history.

(56) References Cited

FOREIGN PATENT DOCUMENTS

| | | | |
|---|---|---|---|
| JP | 2014177217 | A | 9/2014 |
| JP | 2014199385 | A | 10/2014 |
| JP | 2018-154153 | A | 10/2018 |
| JP | 2018-184114 | A | 11/2018 |
| JP | 2019-080145 | A | 5/2019 |
| JP | 2020-071415 | A | 5/2020 |
| JP | 2020-109453 | A | 7/2020 |
| JP | 2020-142657 | A | 9/2020 |
| JP | 2020-190677 | A | 11/2020 |
| KR | 10-2016-0041201 | A | 4/2016 |
| WO | WO-2015064371 | A1 | 5/2015 |
| WO | 2017/033566 | A1 | 3/2017 |
| WO | WO-2019212635 | A1 | 11/2019 |

OTHER PUBLICATIONS

JP 2018-184114 (Nippon Seiki Co., Ltd) Nov. 22, 2018, English Translation, pp. 1-8.*

International Search Report and Written Opinion mailed on Dec. 28, 2021, received for PCT Application PCT/JP2021/041836, filed on Nov. 15, 2021, 12 pages including English Translation.

\* cited by examiner

WS

Dashboard

Wheel

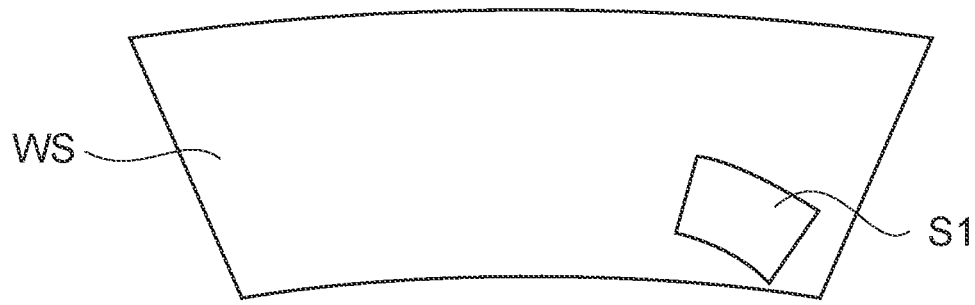
WS
S1
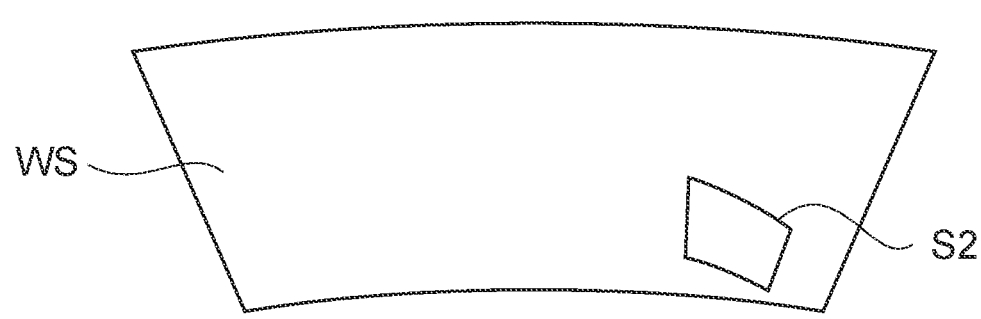
WS
S2
FIG.2

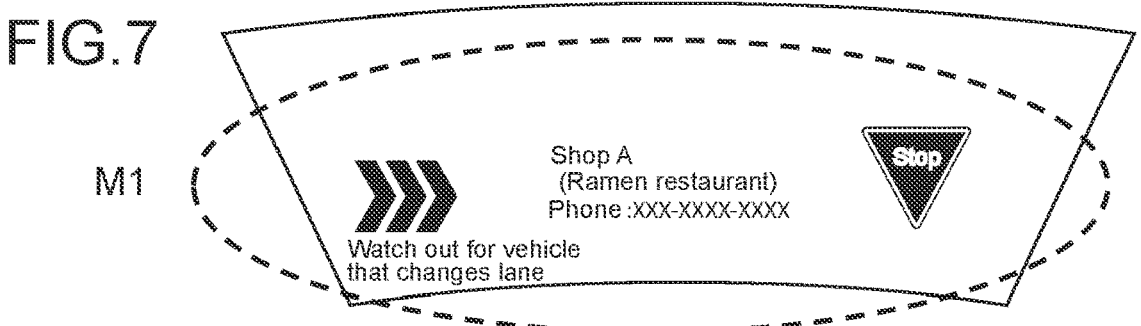

Region on which correction processing is performed for driver's seat

M2

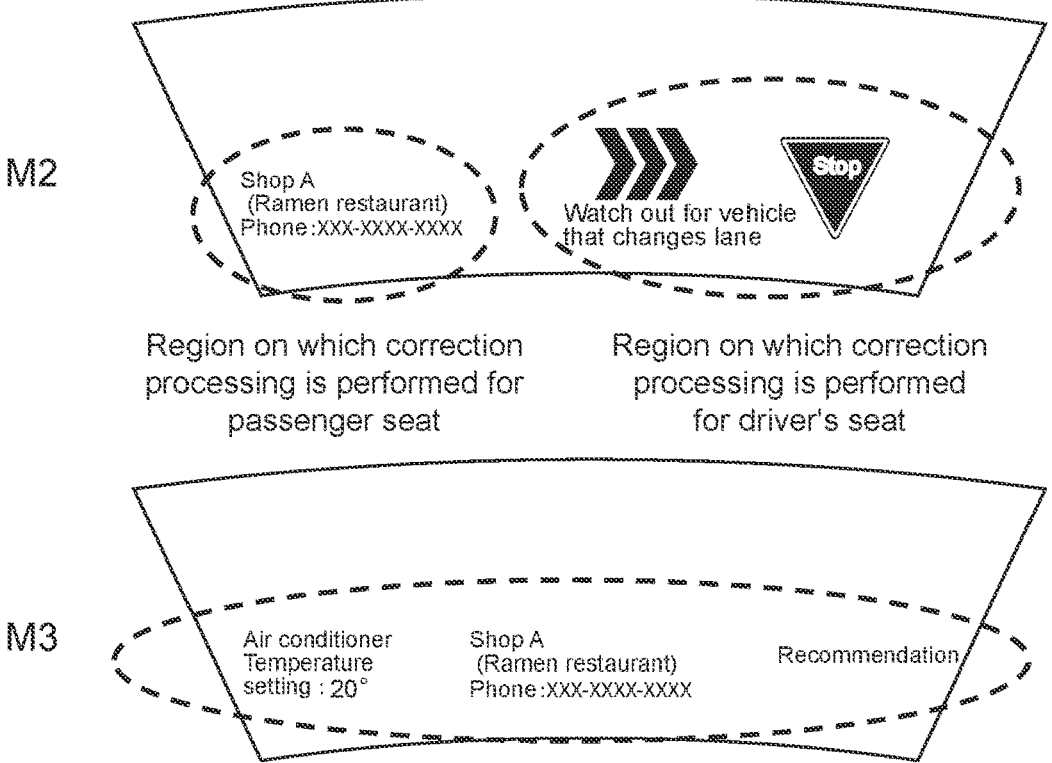

Region on which correction        Region on which correction
processing is performed for        processing is performed
passenger seat                          for driver's seat

M3

Region on which correction processing is performed for passenger seat

M4

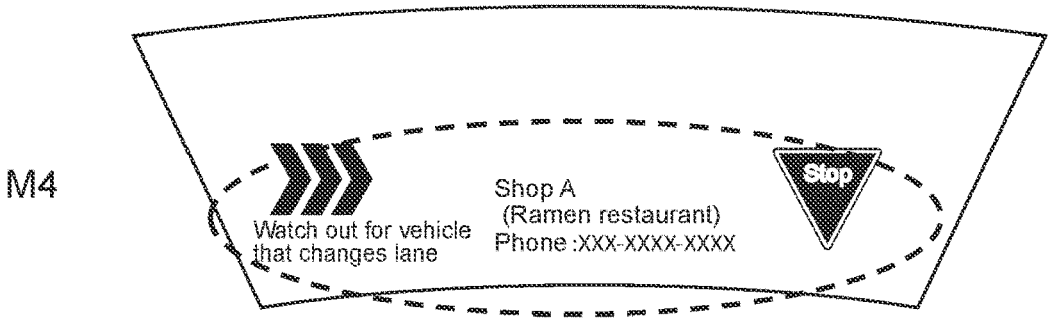

Region on which correction processing is performed for equality mode

| Display mode | | Position of line of sight | Display content | Display position | Viewpoint position |
|---|---|---|---|---|---|
| Mode in which driver is given priority | * This mode will be automatically selected when there is only driver. | n/a | n/a | n/a | n/a |
| Mode in which passenger seat is given priority | * Only when manually selected. Display position for driver's seat is not displayed. | n/a | n/a | n/a | n/a |
| Equal display mode | * Only when manually selected. | n/a | n/a | n/a | n/a |
| Automatic mode | * This is default when there is also person on board in passenger seat. Determination is performed for each content or according to whether line of sight is oriented. | yes | yes | yes | yes |

Automatic mode

Display content

Ex.
- Priority (driver's seat): Speed information, alert, route guidance
- Priority (passenger seat): Detailed POI information, entertainment (video)
- First determined to be viewer: Entertainment (not video), POI information
- Sharing: Air conditioner, temperature, destination, expected time of arrival, remaining distance

Display position

| Display position | Priority | | First determined to be viewer | Sharing |
|---|---|---|---|---|
| | Driver's seat | Passenger seat | | |
| (1) | | | | ○ |
| (2) | | | | ○ |
| (3) | | | | ○ |
| (4) | | ○ | | |
| (5) | ○ | | | |
| (6) | ○ | ○ | | |
| (7) | | ○ | | |
| (8) | ○ | ○ | ○ | |
| (9) | ○ | | | |

Position of line of sight

When person is looking at (8), the person is the first to look at (8) and distortion for the person is corrected for.

FIG.12

DISPLAY CONTROL APPARATUS, DISPLAY CONTROL METHOD, RECORDING MEDIUM, AND DISPLAY SYSTEM THAT CORRECTS DISTORTION BASED ON VIEWPOINT INFORMATION AND A DISPLAY POSITION

CROSS-REFERENCE TO RELATED APPLICATIONS

The present application is based on PCT filing PCT/JP2021/041836, filed Nov. 15, 2021, which claims priority to Japanese Application No. 2020-208455, filed Dec. 16, 2020, the entire contents of each are incorporated herein by reference.

TECHNICAL FIELD

The present disclosure relates to a display system that includes a display control apparatus that generates rendering data of an image, and a display apparatus that displays the image on (projects the image onto) a screen on the basis of the rendering data. Further, the present disclosure relates to the display control apparatus, a display control method that is performed by the display control apparatus, and a recording medium that records therein a display control program that is executed by the display control apparatus.

BACKGROUND ART

A display apparatus (a head-up display system) is known that displays an image on (projects an image onto) a windshield of a vehicle, using the windshield as a screen (Patent Literature 1). The windshield of a vehicle includes a free-form surface. Thus, when a target image is displayed on the windshield without being corrected, the target image will appear distorted to a viewer. Therefore, typically, an image that is corrected (counter-distorted) in advance such that a distortion in the image appears reduced to a driver is displayed on the windshield.

CITATION LIST

Patent Literature

Patent Literature 1: Japanese Patent Application Laid-open No. 2020-190677

DISCLOSURE OF INVENTION

Technical Problem

When a viewing angle of a windshield is wide, an image that is displayed on a windshield (in front of a driver's seat) can be viewed from a driver's seat and a passenger seat. On the other hand, how an image is distorted depends on a curvature of the windshield, and differs depending on a display position, on the windshield, at which the image is displayed, and depending on a position (a driver's seat or a passenger seat) at which the image is viewed. Thus, when an image in which a distortion is corrected for such that a distortion in the image appears reduced to a driver is displayed, a person on board in a passenger seat views a greatly distorted image.

In view of the circumstances described above, it is an object of the present disclosure to display an image that is optimal for each viewer.

Solution to Problem

A display control apparatus according to an embodiment of the present disclosure includes
a distortion correction selecting section that
determines a display position that is a position, on a screen, at which an image of content is displayed,
determines a viewer position that is a position of a viewer who views the image, and
determines, according to the viewer position, transformation information used to correct the image such that a distortion in the image appears reduced to the viewer when the viewer views the image displayed at the display position on the screen; and
a distortion correction processor that renders a correction image that is an image obtained by correcting the image using the transformation information to generate correction-image rendering data that is output to the display apparatus.

When a target image is displayed on (projected onto) the screen (typically a windshield) without being corrected, how the image is distorted may differ depending on a display position, on the screen, at which the image is displayed, and depending on a position of a viewer who views the image. Thus, in the present embodiment, transformation information used to correct an image displayed at the display position such that a distortion in the image appears reduced to a viewer when the viewer views the image at the viewer position is dynamically determined according to the viewer position, the display position being a position at which the image is displayed. This enables a viewer to view an image of content necessary for the viewer in a state in which a distortion in the image appears reduced to the viewer. This results in providing convenience and also in achieving a high degree of safety since visual confusion is less likely to be caused.

The viewer position may include a position in a width direction of the screen and a position in a height direction of the screen.

In the present embodiment, the viewer position includes not only a position in a width direction of the screen but also a position in a height direction of the screen. This makes it possible to correct an image optimally for a viewer himself/herself according to a difference in a body size (the height) of the viewer. This enables a viewer to view an image in which a distortion appears reduced to the viewer, according to a position of the eyes of the viewer. This results in providing convenience and also in achieving a high degree of safety since visual confusion is less likely to be caused.

The distortion correction selecting section may determine the viewer position on the basis of an attribute of the content.

In the present embodiment, a viewer position (who views) is determined on the basis of an attribute of content. Consequently, for example, an image of content necessary for a viewer is displayed such that a distortion in the image appears most reduced to the viewer. This results in becoming more convenient and also in achieving a higher degree of safety.

The distortion correction selecting section may determine the display position on the basis of an attribute of the content.

In the present embodiment, a display position (where to display) is determined on the basis of an attribute of content. Consequently, for example, an image of content necessary for a viewer is displayed in front of the viewer. This results in becoming more convenient and also in achieving a higher degree of safety.

The transformation information may be a parameter used to transform coordinates representing the display position for the image into coordinates representing a pixel of the display apparatus that is used to display the image at the display position, and the pieces of transformation information different from each other may be respectively used correspondingly to the viewer positions of a plurality of the viewer positions different from each other.

In the present embodiment, an image is displayed for each viewer according to a display position such that a distortion in the image appears most reduced to the viewer. This results in becoming more convenient and also in achieving a higher degree of safety.

The distortion correction selecting section may determine the display position on the basis of viewpoint information regarding a viewpoint of the viewer, the viewpoint information indicating a position of eyes of the viewer and a position of the viewpoint of the viewer, the viewpoint information being acquired from a viewpoint information determining section that determines the viewpoint information.

In the present embodiment, a display position (where to display) may be determined on the basis of viewpoint information regarding a viewpoint of a viewer. This makes it possible to display an image at a more optimal position. This results in becoming more convenient and also in achieving a higher degree of safety.

The viewpoint information determining section may determine the pieces of viewpoint information regarding viewpoints of a plurality of candidates for the viewer, and the distortion correction selecting section may determine the display position on the basis of the pieces of viewpoint information regarding the viewpoints of the plurality of candidates.

In the present embodiment, a display position (where to display) may be determined on the basis of pieces of viewpoint information regarding viewpoints of a plurality of candidates (viewpoint positions and positions of eyes). This makes it possible to display an image at a more optimal position. This results in becoming more convenient and also in achieving a higher degree of safety.

The distortion correction selecting section may determine the viewer position on the basis of viewpoint information regarding a viewpoint of the viewer, the viewpoint information indicating a position of eyes of the viewer and a position of the viewpoint of the viewer, the viewpoint information being acquired from a viewpoint information determining section that determines the viewpoint information.

In the present embodiment, the viewer position (who views) may be determined on the basis of viewpoint information regarding a viewpoint of a viewer (a viewpoint position and a position of eyes). This makes it possible to display an image such that a distortion in the image appears more optimally reduced to a viewer. This results in becoming more convenient and also in achieving a higher degree of safety.

The viewpoint information determining section may determine the pieces of viewpoint information regarding viewpoints of a plurality of candidates for the viewer, and the distortion correction selecting section may determine the viewer position on the basis of the pieces of viewpoint information regarding the viewpoints of the plurality of candidates.

In the present embodiment, the viewer position (who views) may be determined on the basis of pieces of viewpoint information regarding viewpoints of a plurality of candidates (viewpoint positions and positions of eyes). This makes it possible to display an image such that a distortion in the image appears more optimally reduced to a viewer. This results in becoming more convenient and also in achieving a higher degree of safety.

The screen may include a freeform surface.

In the present embodiment, the screen includes a freeform surface. Thus, when a target image is displayed on (projected onto) the screen without being corrected, the displayed image appears distorted to a viewer. How an image is distorted depends on a curvature of the windshield, and differs depending on a position, on the screen, at which the image is displayed, and depending on a position of a viewer who views the image. Thus, in the present embodiment, transformation information used to correct an image displayed at the display position such that a distortion in the image appears reduced to a viewer when the viewer views the image at the viewer position is dynamically determined according to the viewer position. This enables a viewer to view an image of content necessary for the viewer in a state in which a distortion in the image appears reduced to the viewer. This results in providing convenience and also in achieving a high degree of safety since visual confusion is less likely to be caused.

The screen may be a windshield of a vehicle.

The windshield of a vehicle includes a freeform surface. Thus, when a target image is displayed on (projected onto) the screen without being corrected, how an image is distorted depends on a curvature of the windshield, and differs depending on a position of a viewer who views the image. Thus, in the present embodiment, transformation information used to correct an image displayed at the display position such that a distortion in the image appears reduced to a viewer when the viewer views the image at the viewer position is dynamically determined according to the viewer position. This enables a viewer to view an image of content necessary for the viewer in a state in which a distortion in the image appears reduced to the viewer. This results in providing convenience and also in achieving a high degree of safety since visual confusion is less likely to be caused.

The distortion correction selecting section may determine, as the viewer position, a driver's seat of the vehicle, a passenger seat of the vehicle, or both the driver's seat and the passenger seat.

In the present embodiment, the viewer position includes a position in a width direction of the screen (a driver's seat, a passenger seat, or a virtual intermediate position). This enables a viewer to view an image in which a distortion appears reduced to the viewer, according to a position of the eyes of the viewer. This results in providing convenience and also in achieving a high degree of safety since visual confusion is less likely to be caused. Further, there is a possibility that, with future development of automated driving, there will be an increasing need for both a viewer in a driver's seat and a viewer in a passenger seat to view an image (such as an image of infotainment content) at the same time. In this case, an image that is easily visible to both a viewer in a driver's seat and a viewer in a passenger seat (a virtual intermediate position) can be displayed.

The display apparatus may be a projection apparatus that is capable of projecting the image onto an entire region of the windshield in a width direction of the windshield.

There is a possibility that, with future development of automated driving, there will be an increasing need for both a viewer in a driver's seat and a viewer in a passenger seat to view an image (such as an image of infotainment content)

on a wide, large screen at the same time. In this case, an image that is easily visible to both a viewer in a driver's seat and a viewer in a passenger seat can be displayed.

A display control method according to an embodiment of the present disclosure includes:

determining a display position that is a position, on a screen, at which an image of content is displayed;

determining a viewer position that is a position of a viewer who views the image;

determining, according to the viewer position, transformation information used to correct the image such that a distortion in the image appears reduced to the viewer when the viewer views the image displayed at the display position on the screen; and rendering a correction image that is an image obtained by correcting the image using the transformation information to generate correction-image rendering data that is output to the display apparatus.

A non-transitory computer-readable recording medium according to an embodiment of the present disclosure that records therein a display control program that operates a control circuit of a display control apparatus as a distortion correction selecting section and a distortion correction processor, the distortion correction selecting section determining a display position that is a position, on a screen, at which an image of content is displayed, the distortion correction selecting section determining a viewer position that is a position of a viewer who views the image, the distortion correction selecting section determining, according to the viewer position, transformation information used to correct the image such that a distortion in the image appears reduced to the viewer when the viewer views the image displayed at the display position on the screen, the distortion correction processor rendering a correction image that is an image obtained by correcting the image using the transformation information to generate correction-image rendering data that is output to the display apparatus.

A display system according to an embodiment of the present disclosure includes:

a display apparatus that displays an image of content on a screen; and a display control apparatus that includes a distortion correction selecting section that determines a display position that is a position, on a screen, at which the image of the content is displayed, determines a viewer position that is a position of a viewer who views the image, and determines, according to the viewer position, transformation information used to correct the image such that a distortion in the image appears reduced to the viewer when the viewer views the image displayed at the display position on the screen, and a distortion correction processor that renders a correction image that is an image obtained by correcting the image using the transformation information to generate correction-image rendering data that is output to the display apparatus.

BRIEF DESCRIPTION OF DRAWINGS

FIG. 2 schematically illustrates an example of a difference in how an image looks to a viewer according to the position of the viewer.

FIG. 7 illustrates an example of a plurality of display modes.

FIG. 12 schematically illustrates an example of a relationship between a display position and a viewer position.

MODE(S) FOR CARRYING OUT THE INVENTION

Embodiments according to the present disclosure will now be described below with reference to the drawings.

I. First Embodiment

1. Overview of Head-Up Display System

The present embodiment relates to a head-up display system that is mounted on a vehicle. In the head-up display system mounted on a vehicle, a display apparatus that is installed in, for example, a dashboard displays an image on (projects an image onto) a windshield that serves as a screen. A viewer (a person on board such as a driver) views the image displayed on (projected onto) the windshield. The windshield of the vehicle includes a freeform surface. Thus, when a target image is displayed on (projected onto) the windshield without being corrected, the displayed image appears distorted to the viewer. How an image is distorted depends on a curvature of the windshield, and differs depending on a display position, on the windshield, at which the image is displayed, and depending on a position of a viewer who views the image (for example, a driver's seat or a passenger seat).

Figure 1:
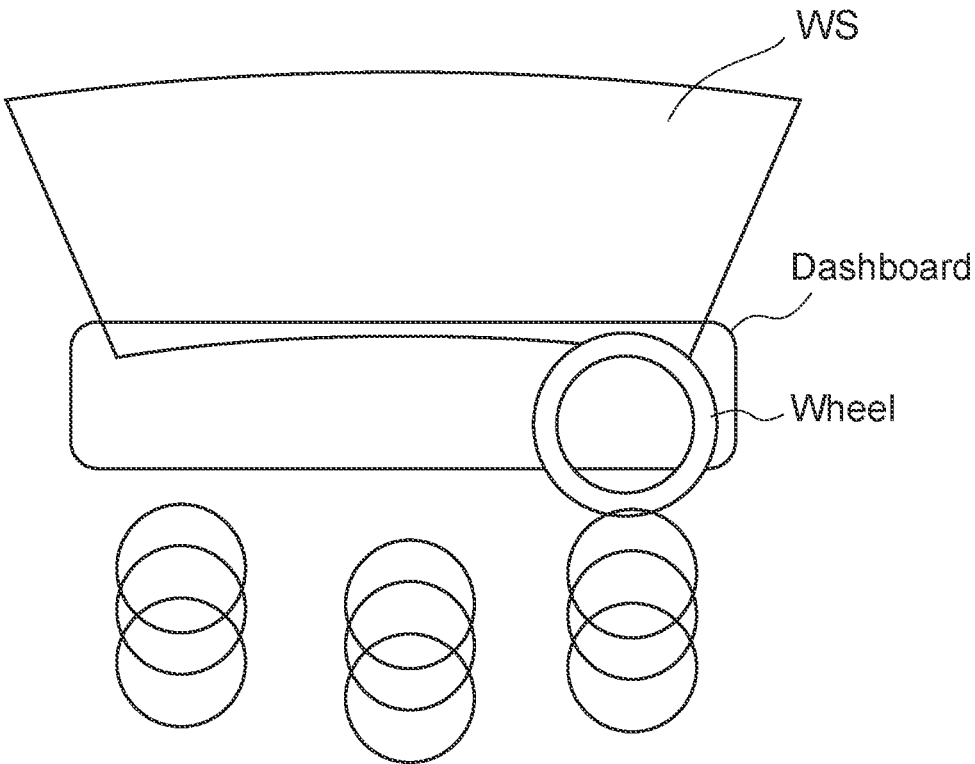
FIG. 1 schematically illustrates a difference in a position of a viewer who views an image.

FIG. 1 schematically illustrates a difference in a position of a viewer who views an image.

A plurality of positions is conceivable as a position of a viewer who views an image (a viewer position). First, a plurality of positions is conceivable in a width direction of a windshield WS that serves as a screen. For example, three positions that are a position of a viewer in a driver's seat (behind the wheel), a position of a viewer in a passenger seat, and a position intermediate between the driver's seat and the passenger seat (the case in which both a driver and a person on board in a passenger seat are viewers) are conceivable. Secondly, a plurality of positions is conceivable in a height direction of the windshield WS serving as a screen. Three positions depending on the position of eyes of (the height of) a viewer that are a high position, a low position, and an intermediate position, are conceivable. Using nine circles, FIG. 1 schematically illustrates three positions in the width direction×three positions in the height direction=nine positions. When an image displayed at one display position on the windshield WS is viewed from the different nine positions, distortions in the image that are viewed from the nine positions are all different from each other.

FIG. 2 schematically illustrates an example of a difference in how an image looks to a viewer according to the position of the viewer.

For example, a display apparatus that is installed in a dashboard in front of a driver's seat displays a rectangular image without correction (projects a rectangular image without correction) at a display position, on the windshield WS, that is situated in front of the driver's seat. Since the windshield of a vehicle includes a freeform surface, the displayed image does not have an original rectangular shape, but a distorted rectangular shape. A viewer in the driver's seat views the distorted rectangular image from the front. On the other hand, a viewer in a passenger seat views the distorted rectangular image from an oblique direction. Thus, a shape S1 of the image viewed by the viewer in the driver's seat and a shape S2 of the image viewed by the viewer in the passenger seat are different from each other. Specifically, the shape S2 of the image viewed by the viewer in the passenger seat is a shape obtained by pulling, in parallel with a diagonal line, the shape S1 of the image viewed by the viewer in the driver's seat, the diagonal line connecting a pair of opposite angles (a pair of an upper-left angle and a lower-right angle in FIG. 2).

Figure 3:
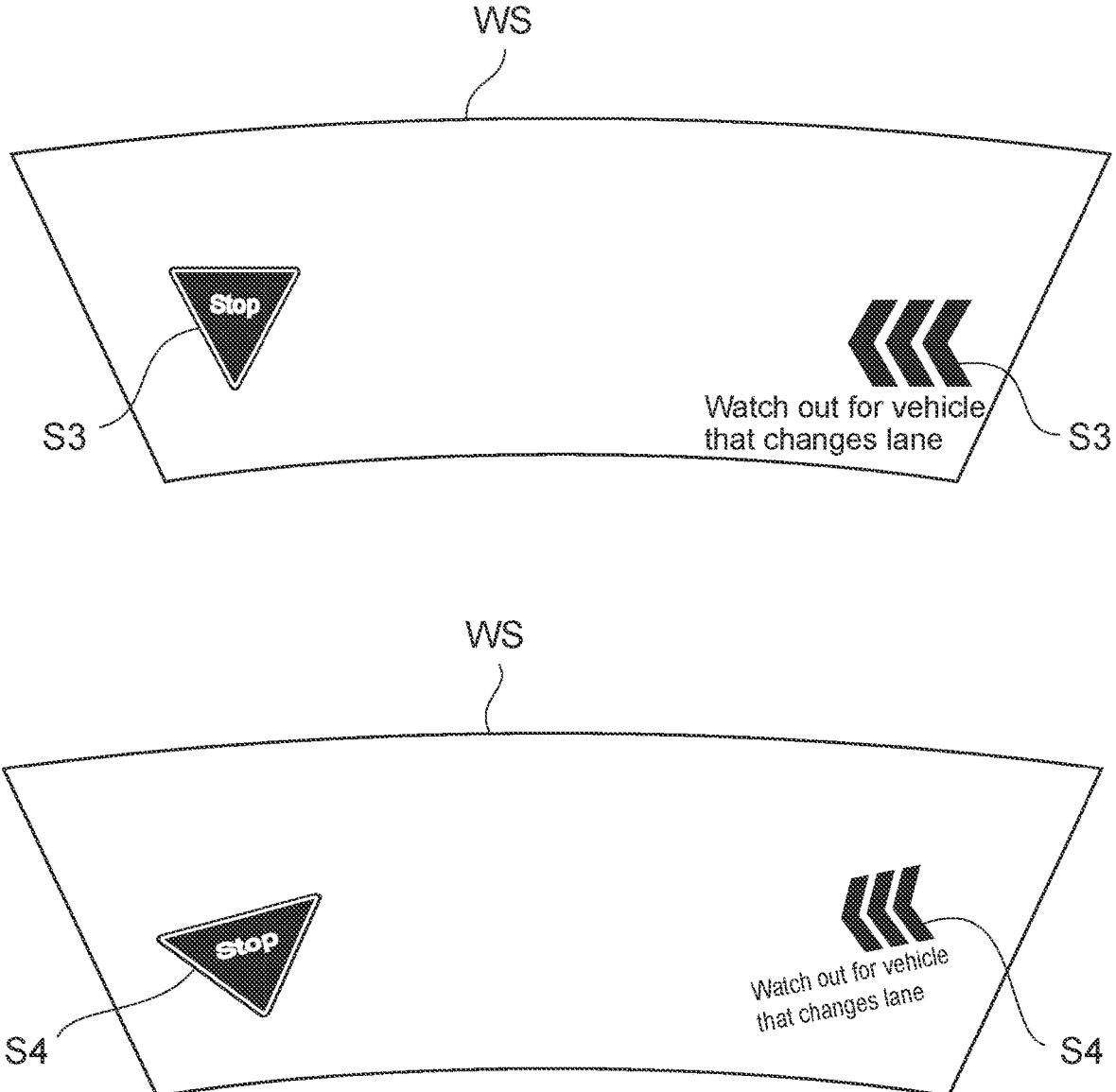
FIG. 3 schematically illustrates another example of the difference in how an image looks to a viewer according to the position of the viewer.

FIG. 3 schematically illustrates another example of the difference in how an image looks to a viewer according to the position of the viewer.

As described above, the windshield includes a freeform surface. Thus, when an image without correction is displayed on (projected onto) the windshield, the displayed image appears distorted to both of the viewers in the driver's seat and in the passenger seat. Therefore, typically, an image that is corrected (counter-distorted) such that a distortion in the image appears reduced to a driver is displayed on the windshield WS. Then, the image viewed by the viewer in the driver's seat has a shape S3 that is a shape with a reduced distortion (or a shape without distortion, and the same applies to the following description). On the other hand, a shape S4 of the image viewed by the viewer in the passenger seat is a distorted shape.

It is favorable that an image of safety-related content (traffic signs and alerts) as illustrated in FIG. 3 be displayed to have a shape of which a distortion appears reduced to a viewer in a driver's seat. On the other hand, it is desirable, from the viewpoint of safety, that an image that has nothing to do with driving (such as an image of infotainment content) be rather displayed to have a shape of which a distortion appears reduced to a viewer in a passenger seat. Further, there is a possibility that, with future development of automated driving, there will be an increasing demand for both a viewer in a driver's seat and a viewer in a passenger seat to view an image (such as an image of infotainment content) on a wide, large screen at the same time. In this case, it is desirable that an image that is easily visible to both a viewer in a driver's seat and a viewer in a passenger seat be displayed.

In view of the circumstances described above, a display system 1 according to the present embodiment displays an image optimal for each viewer (that is, an image in which a distortion has been corrected for using an optimal method) on a windshield of a vehicle.

2. Configuration of Display System

Figure 4:
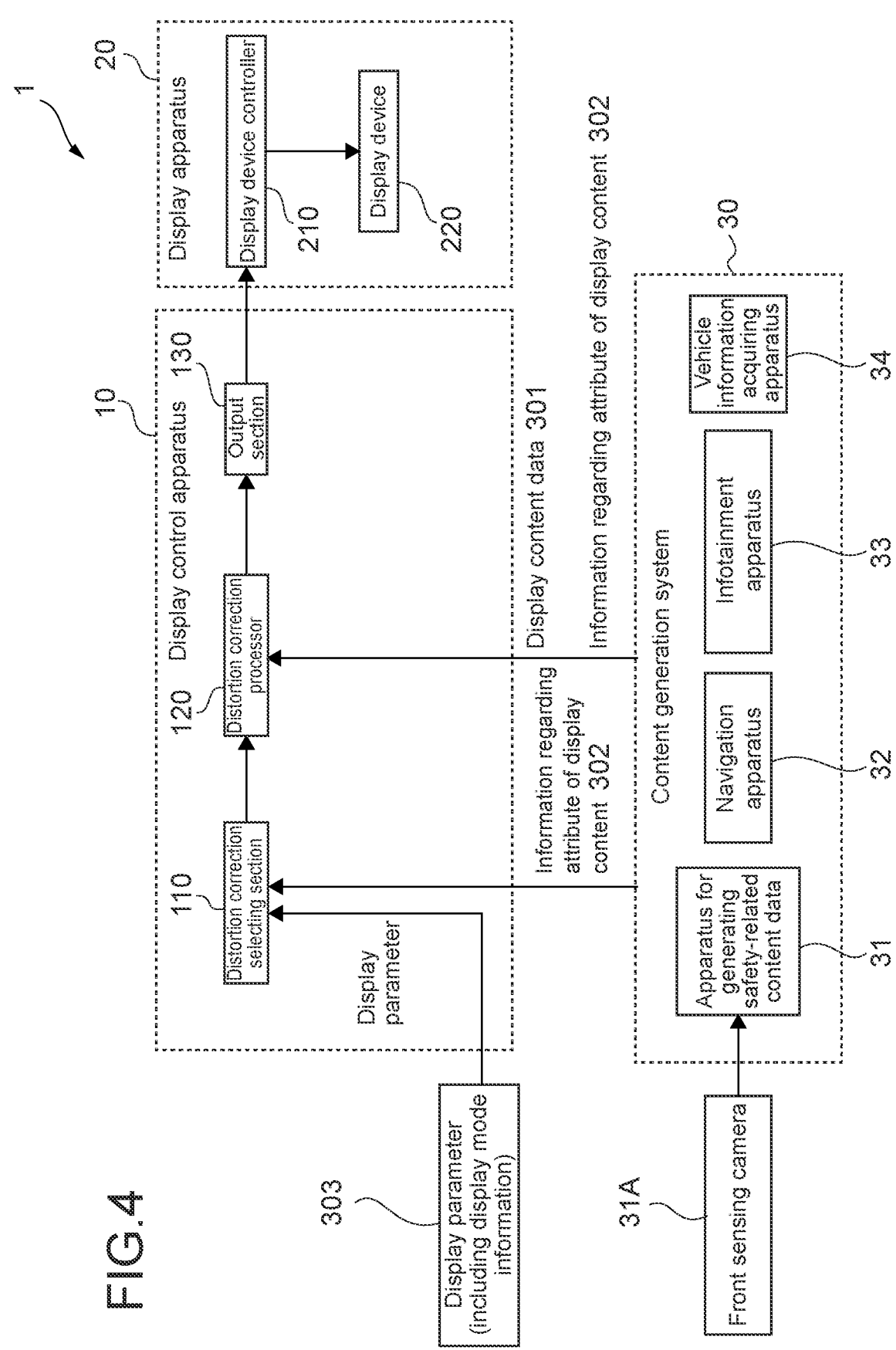
FIG. 4 illustrates a configuration of a display system according to a first embodiment of the present disclosure.

FIG. 4 illustrates a configuration of a display system according to a first embodiment of the present disclosure.

The display system 1 is a head-up display system that is mounted on a vehicle. The display system 1 includes a display control apparatus 10 and a display apparatus 20.

The display control apparatus 10 acquires, from a content generation system 30, data (images and metadata) of content (such as safety-related content, navigation content, infotainment content, and content of vehicle information such as speed). A distortion correction selecting section 110, a distortion correction processor 120, and an output section 130 of the display control apparatus 10 are implemented by the display control apparatus 10 loading, into a RAM, a display control program recorded in a ROM and by a CPU executing the display control program. The display control apparatus 10 corrects an image of content (the distortion correction selecting section 110), generates rendering data of an image obtained by the correction (the distortion correction processor 120), and outputs the rendering data to the display apparatus 20 (the output section 130).

The display apparatus 20 is installed in, for example, a dashboard of a vehicle. The display apparatus 20 includes a display device controller 210 and a display device 220. The display device 220 uses a very small LED element such as a micro LED panel as a light source. The display device controller 210 controls the display device 220 to cause an image to be displayed on (projected onto) a windshield of the vehicle that serves as a screen, on the basis of the rendering data input by the display control apparatus 10. A viewer views an image that is displayed (projected) by the display device 220 to be reflected off the windshield. The display device 220 (such as a micro LED panel) is installed in, for example, all of the region of the dashboard in a width direction of the dashboard. This results in displaying an image in all of, or almost all of the region of the windshield in the width direction of the windshield. The display device 220 may be a single panel that continuously extends over all of, or almost all of the region of the dashboard in the width direction of the dashboard, or may include a plurality of panels obtained by performing division in the width direction of the dashboard.

The display apparatus is a system that uses a display device (such as a liquid crystal display (LCD), an organic light-emitting diode (LED) display, or a micro LED display), and is a display apparatus that directly displays light from a display panel on (irradiates light from a display panel onto) a screen without a distortion correcting lens or a mirror used to correct for distortions.

Further, the display apparatus may be a display apparatus that uses a projector, and a distortion correction lens or a mirror used to correct for distortions.

The content generation system 30 is a general term for a plurality of apparatuses being independent of one another and generating content of an image displayed by the display apparatus 20. The content generation system 30 includes, for example, an apparatus 31 for generating safety-related content, a navigation apparatus 32, an infotainment apparatus 33, and a vehicle information generating apparatus 34. The apparatus 31 for generating safety-related content, the navigation apparatus 32, the infotainment apparatus 33, and the vehicle information generating apparatus 34 each generate data (images and metadata) of content and output the data of content to the display control apparatus 10.

The apparatus 31 for generating safety-related content acquires an image captured by a front sensing camera 31A (a camera that captures an image of an environment ahead of a vehicle). The apparatus 31 for generating safety-related content detects a distance to a vehicle that is traveling ahead, and a vehicle that changes a lane, on the basis of the acquired captured image, generates alert content used to alert a driver, and outputs the alert content to the display control apparatus 10.

The navigation apparatus 32 is a car navigation system. The navigation apparatus 32 generates navigation content that indicates, for example, route guidance information such as turning right or left, information regarding a destination (POI) (for example, store information such as a name and a phone number of a store), and outputs the generated information to the display control apparatus 10.

The infotainment apparatus 33 is an apparatus that plays back, for example, audio content and video content. The infotainment apparatus 33 generates infotainment content that indicates information regarding audio content and video content (such as titles, players, performers, jacket images of audio content, and videos of video content itself), and outputs the generated information to the display control apparatus 10.

The vehicle information generating apparatus 34 acquires information regarding a vehicle, such as a traveling speed and an air conditioner temperature, generates vehicle information content that indicates the information regarding a vehicle, and outputs the generated vehicle information content to the display control apparatus 10.

3. Operation of Display System

Figure 5:
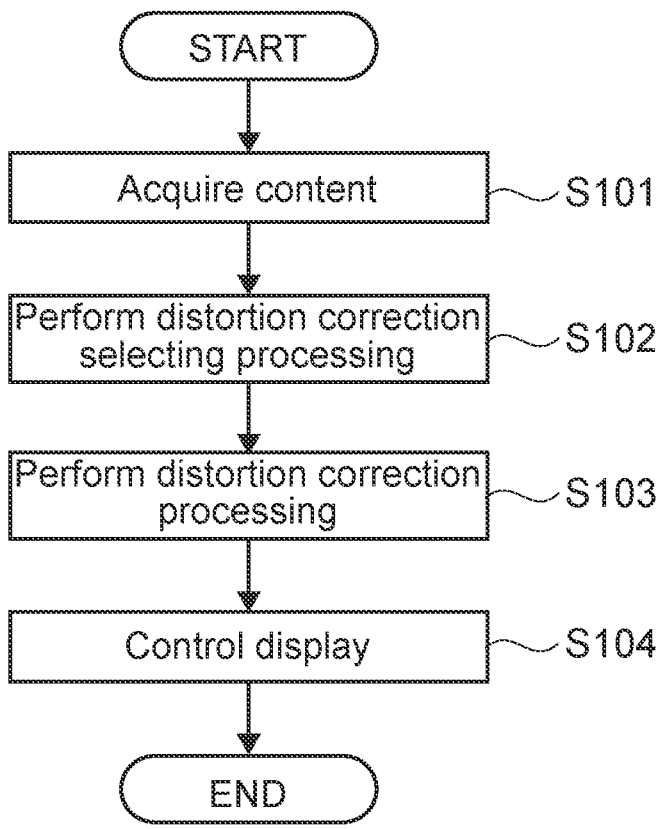
FIG. 5 illustrates a flow of an operation of the display system.

FIG. 5 illustrates a flow of an operation of the display system.

(1) Step S101: Acquisition of Content

The display control apparatus 10 acquires content that is generated by the content generation system 30. Specifically, the display control apparatus 10 acquires, from the content generation system 30, image data 301 of content (such as traffic signs, alerts, speed information, navigation information, and moving images), and information 302 regarding an attribute of content. The information 302 regarding an attribute of content includes a content ID, the type of content (such as speed information, alerts, route guidance, detailed information regarding a point of interest (POI), entertainment (videos), entertainment (not videos), information regarding a point of interest (POI), air conditioners, the temperature, maps, destinations, the expected time of arrival, and the remaining distance).

(2) Step S102: Distortion Correction Selecting Processing

Figure 6:
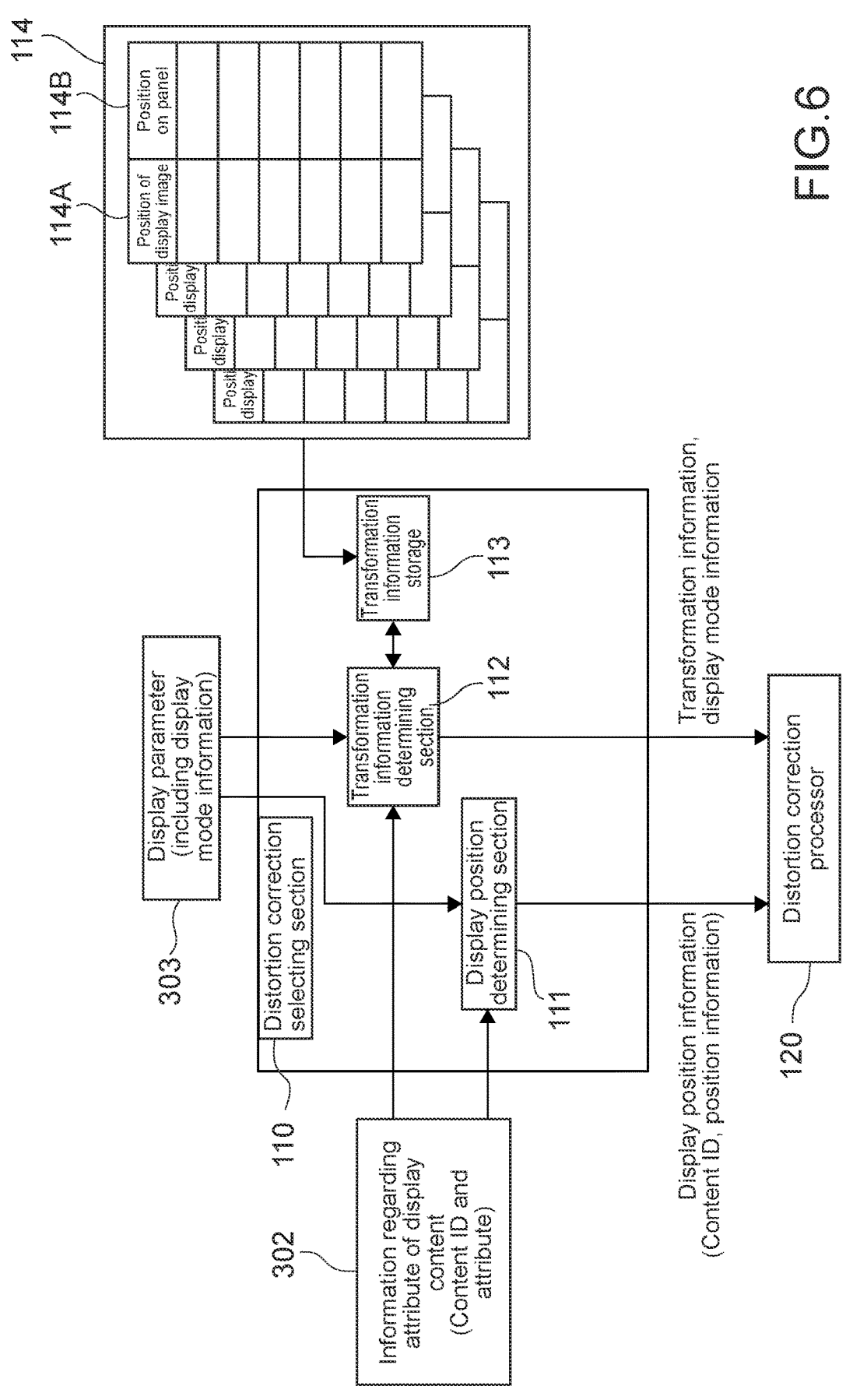
FIG. 6 illustrates a functional configuration of a distortion correction selecting section.

FIG. 6 illustrates a functional configuration of the distortion correction selecting section.

The distortion correction selecting section 110 selects transformation information used to correct for distortions in an image of content. The distortion correction selecting section 110 includes a display position determining section 111, a transformation information determining section 112, and a transformation information storage 113.

The display position determining section 111 determines a position (a display position), on a windshield, at which an image of content is displayed. Specifically, the display position determining section 111 determines the display position on the basis of a display parameter 303 that includes display mode information that is input to be set in advance through a user interface (not illustrated). For example, one of a mode in which a driver's seat is given priority, a division presentation mode, a mode in which a passenger seat is given priority, an equality mode, and an automatic mode is set to be a display mode in advance. One of these display modes (for example, a mode in which a driver's seat is given priority) may be set to be used at all times.

Alternatively, the display position determining section 111 may determine a display position according to an attribute of content. In other words, a different display mode may be selectively used according to the attribute of content. For example, images of pieces of content regarding, for example, speed information, an alert, and route guidance may be set to be displayed in the mode in which a driver's seat is given priority. Images regarding, for example, detailed POI information (such as a word of mouth) and entertainment (videos) may be set to be displayed in the mode in which a passenger seat is given priority. Images of pieces of content regarding, for example, an air conditioner, a temperature, a map, a destination, an expected time of arrival, and a remaining distance may be set to be displayed in the equality mode.

When a different display mode is set according to an attribute of content, the display position determining section 111 determines a display position on the basis of the display parameter 303 corresponding to the information 302 regarding an attribute of content (the type of content). It is sufficient if the display position is, for example, one of, or a plurality of regions obtained by dividing a windshield into three in a longitudinal direction x three in a lateral direction=nine.

FIG. 7 illustrates an example of a plurality of display modes.

A mode M1 in which a driver's seat is given priority is a mode in which an image corrected such that a distortion in the image appears reduced to a viewer in a driver's seat is displayed on an entire surface of a windshield. The mode M1 in which a driver's seat is given priority is suitable to display an image of, for example, safety-related content. A division presentation mode M2 is a mode in which two display positions obtained by dividing a windshield in a width direction of the windshield are set, where an image corrected such that a distortion in the image appears reduced to a viewer in a driver's seat is displayed at the display position situated close to the driver's seat, and an image corrected such that a distortion in the image appears reduced to a viewer in a passenger seat is displayed at the display position situated close to the passenger seat. A mode M3 in which a passenger seat is given priority is a mode in which an image corrected such that a distortion in the image appears reduced to a viewer in a passenger seat is displayed on an entire surface of a windshield. The mode M3 in which a passenger seat is given priority is suitable to display an image of, for example, infotainment content. An equality mode M4 is a mode in which an image corrected such that a distortion in the image appears reduced to both a viewer in a driver's seat and a viewer in a passenger seat (such that a distortion in the image appears reduced, as viewed at a virtual viewer position intermediate between the driver's seat and the passenger seat) is displayed on an entire surface of a windshield. An automatic mode (not illustrated) is a mode in which a viewer is determined according to an attribute of content and an image corrected such that a distortion in the image appears reduced to the viewer is displayed.

The transformation information determining section 112 determines a position (a viewer position) of a viewer who views an image of content that is displayed at a display position. The transformation information determining section 112 determines the viewer position according to the information 302 regarding an attribute of content (the type of content) and the display parameter 303 including a display mode. For example, when display mode information included in the display parameter 303 indicates the mode in which a driver's seat is given priority, the transformation information determining section 112 may determine a driver's seat as the viewer position at all times. Alternatively, when the display mode information included in the display parameter 303 indicates the mode in which a driver's seat is given priority but the type of content included in the information 302 regarding an attribute of content is infotainment, the transformation information determining section 112 may determine a passenger seat as the viewer position. As described above, the transformation information determining section 112 may have the order of priority depending on an attribute of content in the form of, for example, a table. The transformation information determining section 112 may determine not only a position in a width direction of a windshield (a driver's seat, a passenger seat, or a virtual intermediate position) but also a position in a height direction of the windshield. For example, the position of eyes of (the height of) a person on board who often uses a driver's seat or a passenger seat may be input to be set in the transformation information determining section 112 in advance.

The transformation information determining section 112 determines transformation information used to correct a displayed image. Specifically, according to the viewer position, the transformation information determining section 112 determines transformation information used to correct an image displayed at a display position on a windshield (a display position determined by the display position determining section 111) such that a distortion in the image appears reduced to a viewer when the viewer views the image at the viewer position. The transformation information determining section 112 refers to the transformation information storage 113 to determine transformation information 114.

The transformation information storage 113 stores therein a plurality of different pieces of transformation information 114 respectively correspondingly to different viewer positions of a plurality of different viewer positions. For example, the plurality of different pieces of transformation information 114 is nine pieces of transformation information 114 (FIG. 1) at three positions in the width direction×three positions in the height direction. The transformation information 114 is a parameter used to transform coordinates 114A representing a display position for an image into coordinates 114B representing a pixel of the display apparatus 20 (the display device 220) that is used to display the image at the display position. In other words, the transformation information 114 is a transformation parameter used to output, from the display apparatus 20, an image (an image after correction) obtained by a target image (without distortion) being counter-distorted. The transformation information determining section 112 uses different pieces of transformation information 114 respectively correspondingly to different viewer positions of a plurality of different viewer positions. In other words, the transformation information determining section 112 determines a piece of transformation information 114 corresponding to a determined viewer position. The transformation information 114 may be, for example, a lookup table or a transformation function. For each model of vehicle, the transformation information 114 differs depending on a shape of a windshield, a position of a seat, and a position of the display apparatus 20. Thus, the transformation information 114 may be created in advance from, for example, experiment.

The distortion correction selecting section 110 outputs, to the distortion correction processor 120, a content ID that is acquired from the content generation system 30, a display position that is determined by the display position determining section 111, and the transformation information 114 determined by the transformation information determining section 112.

(3) Step S103: Distortion Correction Processing

Figure 8:
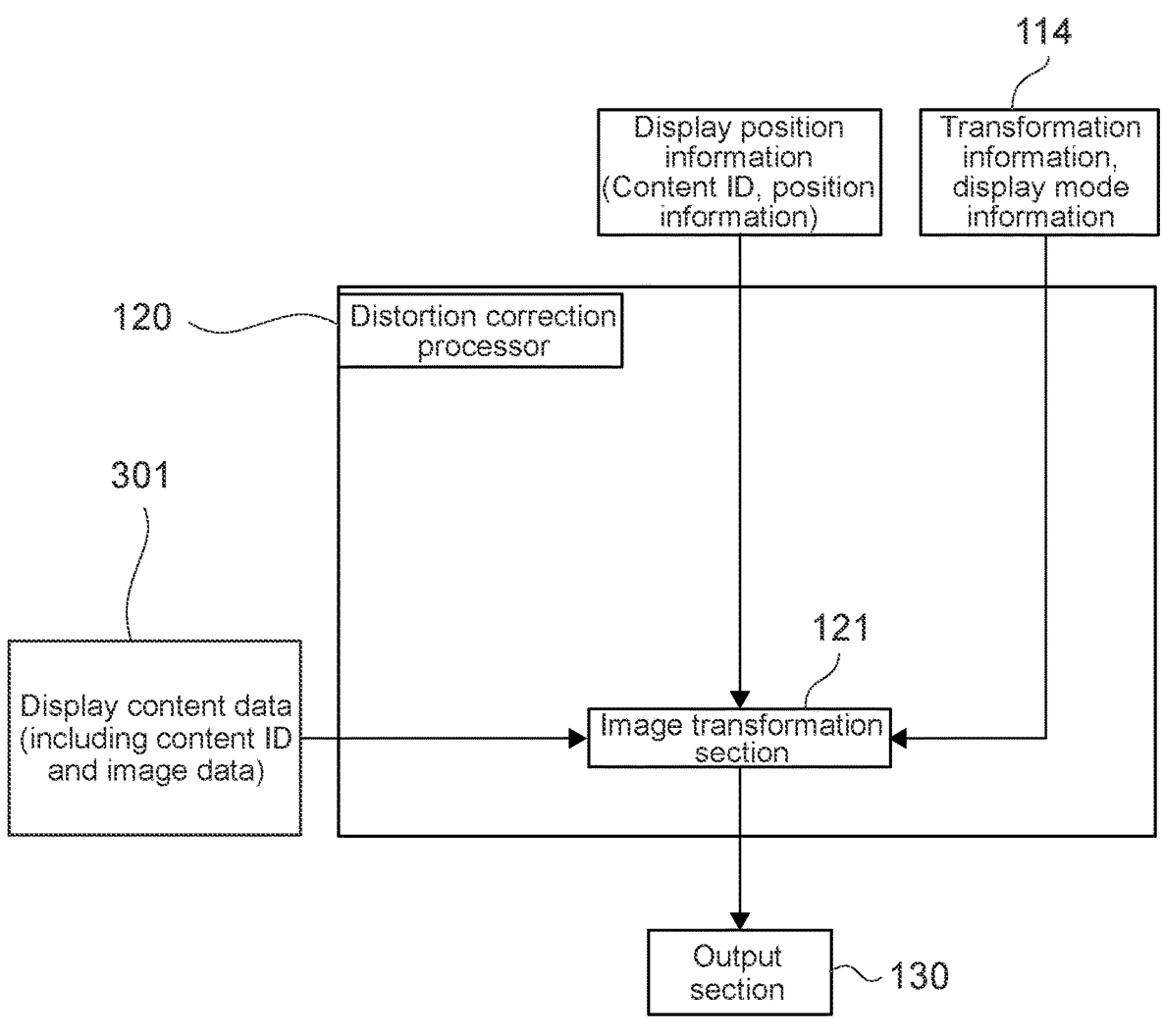
FIG. 8 illustrates a functional configuration of a distortion correction processor.

FIG. 8 illustrates a functional configuration of the distortion correction processor.

The distortion correction processor 120 acquires, from the distortion correction selecting section 110, a content ID, a display position, and the transformation information 114. The distortion correction processor 120 acquires, from the content generation system 30, an image (image data) of content associated with a content ID acquired from the distortion correction selecting section 110. The distortion correction processor 120 includes an image transformation section 121. The image transformation section 121 is a video module, and renders a correction image that is an image obtained by correcting the acquired image using the transformation information 114. Specifically, the image transformation section 121 reads, from the transformation information 114, a pixel 114B of the display apparatus 20 that corresponds to a display position (the coordinates 114A) that is acquired from the distortion correction selecting section 110. The image transformation section 121 renders a correction image by mapping an image of content to the pixel 114B of the display apparatus 20. Accordingly, correction-image rendering data is generated. Note that a coordinate transformation is actually performed only on a pixel that outputs a display signal.

Note that different images may be displayed for the same content on the basis of display mode information. In other words, the content generation system 30 may generate a plurality of different content images in association with a content ID that represents a piece of content. In this case, the image transformation section 121 determines an image to be displayed, on the basis of display mode information. In this case, for example, a display image depending on display mode information is specified using a number with dash that is indicated below and serves as a display content ID. For example, it is sufficient if the number with dash is used in, for example, representation such as "Nnnn-0: a display image is not dependent on display mode information", "Nnnn-1: an image for a mode in which a driver's seat is given priority", "Nnnn-2: an image for a mode in which a passenger seat is given priority", "Nnnn-3: an image for a compromise mode", "Nnnn-4: an image for a driver's seat for a division presentation mode", and "Nnnn-5: an image for a passenger seat for a division presentation mode". Note that the distortion correction selecting section 110 (the display position determining section 111) does not consider the number with dash upon determining a display position.

(4) Step S104: Display Control

The output section 130 outputs, to the display apparatus 20, the correction-image rendering data generated by the distortion correction processor 120. The display apparatus 20 acquires the correction-image rendering data input by the display control apparatus 10. The display device controller 210 controls the display device 220 to cause an image to be displayed on (projected onto) a windshield of a vehicle that serves as a screen, on the basis of the rendering data.

II. Second Embodiment

In a second embodiment, a position (a viewer position) of a viewer who views an image, and a display position for the image are determined further on the basis of viewpoint information regarding a viewpoint of the viewer (a position of eyes and a position of the viewpoint). Regarding the other points, the second embodiment is similar to the first embodiment.

Hereinafter, descriptions and illustrations of a component, an operation and the like that are similar to the component, the operation, and the like described above are omitted, and the description and the illustration are given focused on a point different from that described above.

Figure 9:
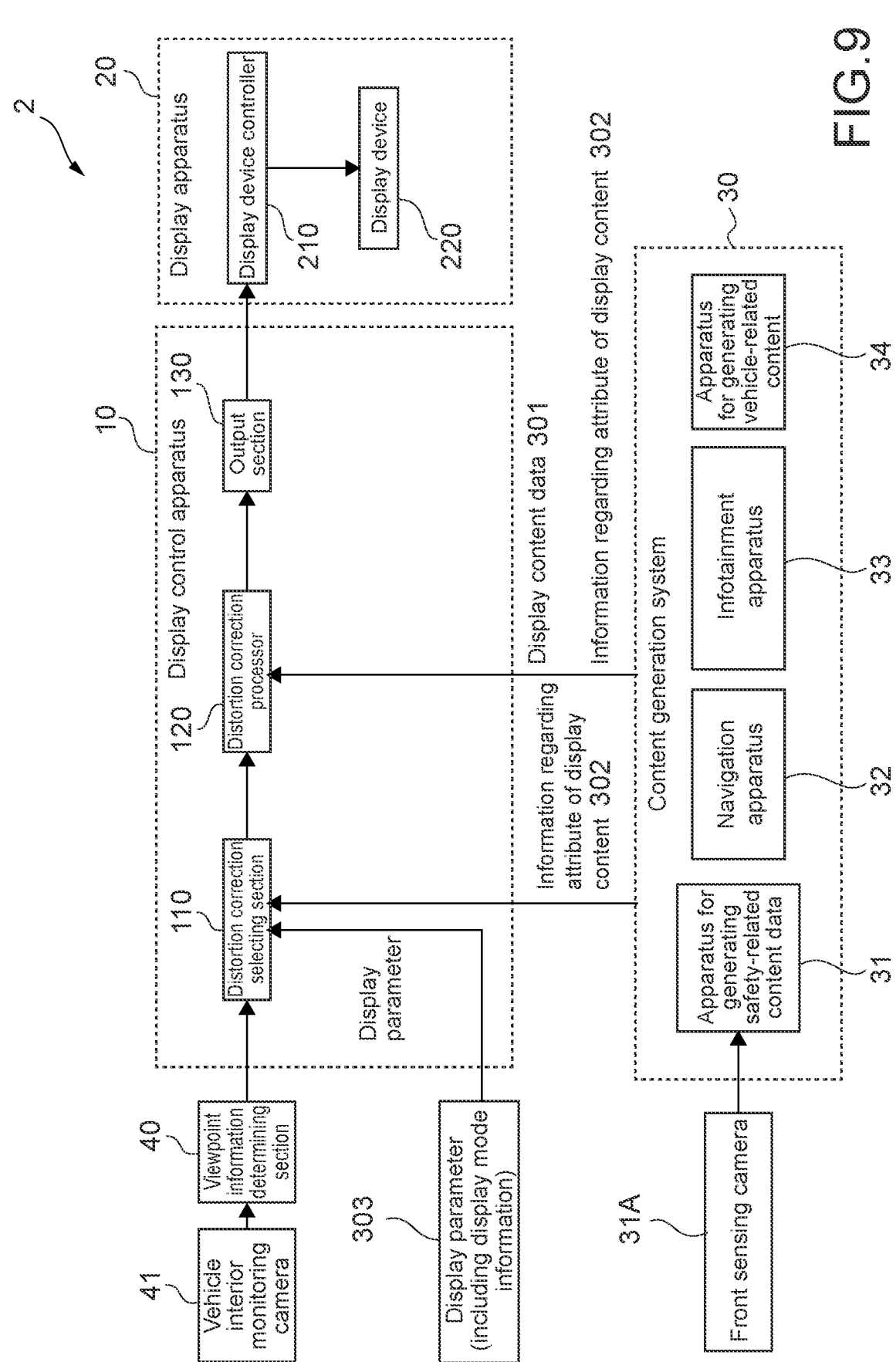
FIG. 9 illustrates a configuration of a display system according to a second embodiment of the present disclosure.

FIG. 9 illustrates a configuration of a display system according to the second embodiment of the present disclosure.

In addition to the configuration of the display system 1 of the first embodiment (FIG. 4), a display system 2 includes a vehicle interior monitoring camera 41 and a viewpoint information determining section 40.

The vehicle interior monitoring camera 41 is installed in, for example, a dashboard of a vehicle. The vehicle interior monitoring camera 41 captures images of a person on board in a driver's seat and of a person on board in a passenger seat, and outputs captured-image data to the viewpoint information determining section 40.

The viewpoint information determining section 40 acquires the captured-image data from the vehicle interior monitoring camera 41. The viewpoint information determining section 40 determines viewpoint information regarding a viewpoint of a person on board on the basis of the captured-image data. The viewpoint information includes a viewpoint position (a gaze point on a windshield) and a level of eyes (eyeballs) (the height). The viewpoint information determining section 40 may be implemented by a dedicated hardware resource and a dedicated software resource. Alternatively, the viewpoint information determining section 40 may be implemented by the display control apparatus 10 loading, into a ROM, a display control program recorded in a ROM and by a CPU executing the display control program.

2. Operation of Display System

Figure 10:
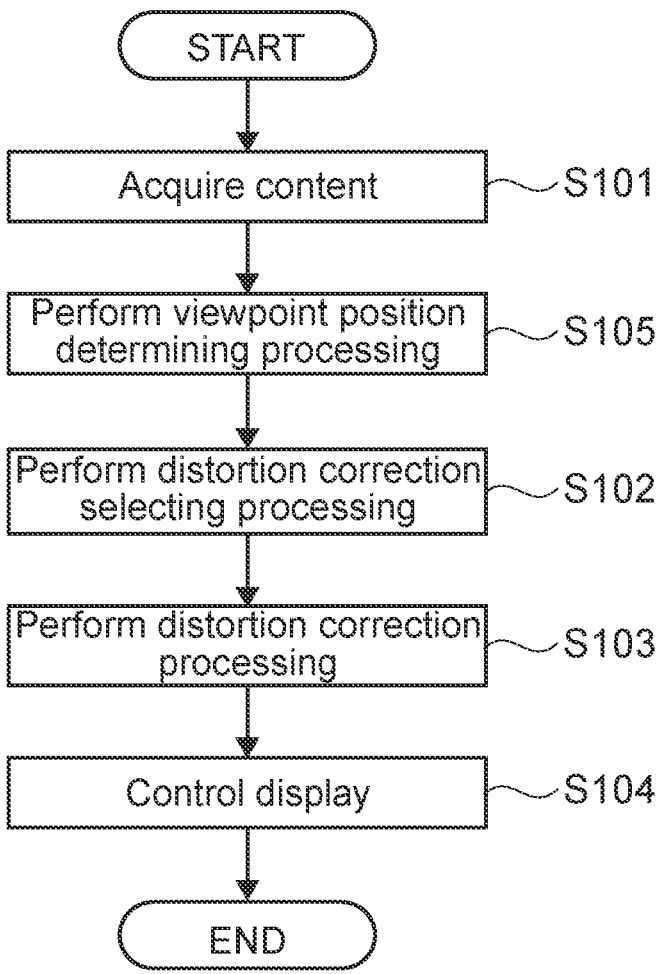
FIG. 10 illustrates a flow of an operation of the display system.

FIG. 10 illustrates a flow of an operation of the display system.

Steps S101, S103, and S104 are similar to those in the first embodiment. The second embodiment is different from the first embodiment in Step S105 added after Step S101 and the process of Step S102 after Step S105.

(1) Step S105: Viewpoint Position Determining Processing

The viewpoint information determining section 40 acquires captured-image data from the vehicle interior monitoring camera 41. The viewpoint information determining section 40 determines viewpoint information regarding a viewpoint of a person on board on the basis of the captured-image data. The viewpoint information includes a viewpoint position (a gaze point on a windshield) and a level of eyes (eyeballs) (the height). When there is one person on board (a driver), the viewpoint information determining section 40 determines viewpoint information regarding a viewpoint of the driver. When there is a plurality of persons on board (a driver and a person on board in a passenger seat), the viewpoint information determining section 40 determines pieces of viewpoint information regarding viewpoints of the plurality of persons on board. The viewpoint information determining section 40 outputs the viewpoint information to the distortion correction selecting section 110. The plurality of persons on board is a plurality of candidates for a viewer.

(2) Step S102: Distortion Correction Selecting Processing

Figure 11:
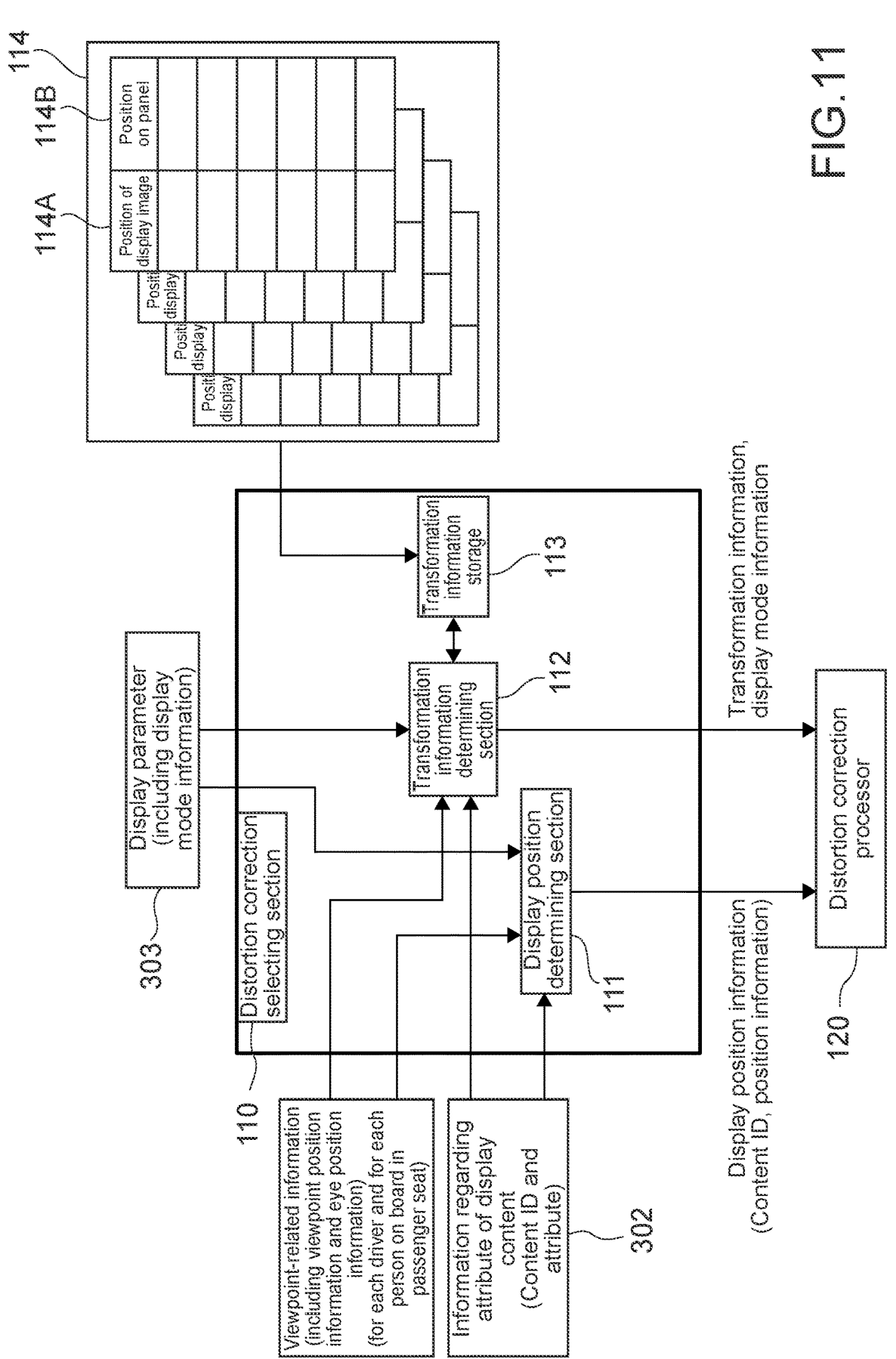
FIG. 11 illustrates a functional configuration of a distortion correction selecting section.

FIG. 11 illustrates a functional configuration of the distortion correction selecting section.

The display position determining section 111 determines a position (a display position), on a windshield, at which an image of content is displayed. Specifically, the display position determining section 111 determines the display position on the basis of the display parameter 303 including display mode information that is input to be set in advance through a user interface (not illustrated). For example, one of a mode in which a driver's seat is given priority, a division presentation mode, a mode in which a passenger seat is given priority, an equality mode, and an automatic mode is set to be the display mode in advance.

When the automatic mode is set, the display position determining section 111 determines a display position on the basis of viewpoint information acquired from the viewpoint information determining section 40. When there is one person on board (a driver), the display position determining section 111 determines the display position on the basis of viewpoint information regarding a viewpoint of the driver. Specifically, when the display position determining section 111 only acquires viewpoint information regarding a viewpoint of the driver (when the driver is the only person on board), the display position determining section 111 determines, as the display position, a position that is easily visible to the driver (in front of a driver's seat). On the other hand, when there is a plurality of persons on board (a driver and a person on board in a passenger seat), the display position determining section 111 determines the display position on the basis of pieces of viewpoint information regarding viewpoints of a plurality of persons on board (candidates) corresponding to candidates for a viewer.

The transformation information determining section 112 determines a position of a viewer (a viewer position) who views an image of content that is displayed at a display position. When the automatic mode is set, it is sufficient if the transformation information determining section 112 determines, as a viewer and on the basis of viewpoint information acquired from the viewpoint information determining section 40, a person on board, from among a plurality of persons on board (candidates), who was the first to start viewing. When, in particular, an intermediate position, on a windshield, that is easily visible to all of a plurality of persons on board (a driver and a person on board in a passenger seat) is determined as a display position, it is sufficient if the transformation information determining section 112 determines, as a viewer, a person on board who was the first to start viewing.

FIG. 12 schematically illustrates an example of a relationship between a display position and a viewer position.

When the automatic mode is set, it is sufficient if the display position determining section 111 determines a display position on the basis of viewpoint information acquired from the viewpoint information determining section 40, and the transformation information determining section 112 determines viewer position on the basis of the viewpoint information (an upper portion). When an intermediate position (8), on a windshield, that is easily visible to all of a plurality of persons on board (a driver and a person on board in a passenger seat) is determined as a display position, it is sufficient if the transformation information determining section 112 determines, as a viewer, a person on board who was the first to start viewing (the first determined to be a viewer).

The transformation information determining section 112 determines transformation information used to correct a displayed image. Specifically, according to the viewer position, the transformation information determining section 112 determines transformation information used to correct an image displayed at a display position on a windshield (a display position determined by the display position determining section 111) such that a distortion in the image appears reduced to a viewer when the viewer views the image at the viewer position. The transformation information determining section 112 refers to the transformation information storage 113 to determine transformation information 114.

III. Conclusion

In the present embodiment, the display device 220 (such as a micro LED panel) is installed in, for example, all of, or almost all of the region of a dashboard in a width direction of the dashboard. This results in displaying an image in all of, or almost all of the region of a windshield in a width direction of the windshield. A viewer (a person on board such as a driver) views the image displayed on (projected onto) the windshield. The windshield of a vehicle includes a freeform surface. Thus, when a target image is displayed on (projected onto) the windshield without being corrected, the displayed image appears distorted to the viewer. How an image is distorted depends on a curvature of the windshield, and differs depending on a display position, on the windshield, at which the image is displayed, and depending on a position of a viewer who views the image (for example, a driver's seat or a passenger seat).

Thus, in the present embodiment, a display position at which a display-target image is displayed, and a viewer position (a position in a width direction of a windshield and a position in a height direction of the windshield) are determined on the basis of an attribute of content of the display-target image. Transformation information used to correct an image displayed at the display position such that a distortion in the image appears reduced to a viewer when the viewer views the image at the viewer position is dynamically determined according to the viewer position. This enables a viewer to view an image of content necessary for the viewer in a state in which a distortion in the image appears reduced to the viewer. This results in providing convenience and also in achieving a high degree of safety since visual confusion is less likely to be caused.

In the present embodiment, the viewer position includes not only a position in a width direction of a windshield (a driver's seat, a passenger seat, or a virtual intermediate position) but also a position in a height direction of the windshield. This makes it possible to correct an image optimally for a viewer himself/herself according to a difference in a body size (the height) of the viewer. This enables a viewer to view an image in which a distortion appears reduced to the viewer, according to a position of the eyes of the viewer. This results in providing convenience and also in achieving a high degree of safety since visual confusion is less likely to be caused.

Further, there is a possibility that, with future development of automated driving, there will be an increasing need for both a viewer in a driver's seat and a viewer in a passenger seat to view an image (such as an image of infotainment content) on a wide, large screen at the same time. In this case, an image that is easily visible to both a viewer in a driver's seat and a viewer in a passenger seat can be displayed.

In the present embodiment, a viewer position (who views) and a display position (where to display) are determined on the basis of an attribute of content. Consequently, for example, an image of safety-related content necessary for a driver is displayed in front of the driver, and the image is displayed such that a distortion in the image appears most reduced to the driver. This results in becoming more convenient and also in achieving a higher degree of safety.

In the present embodiment, the viewer position (who views) and the display position (where to display) may be determined on the basis of viewpoint information regarding a viewpoint of a viewer (a viewpoint position and a position of eyes). This makes it possible to display an image at a more optimal position, and to display the image such that a distortion in the image appears more optimally reduced to a viewer. This results in becoming more convenient and also in achieving a higher degree of safety.

In the first and second embodiments, the display control apparatus and the display apparatus have been described as separate bodies. However, the display control apparatus may be included in the display apparatus. Further, at least one of a plurality of blocks included in the display control apparatus may be included in the display apparatus. Furthermore, a portion of blocks in the display apparatus may be included in the display control apparatus. Moreover, at least one of the respective blocks may be another apparatus that is different from the display control apparatus and the display apparatus.

The present disclosure may also include the following configurations.

(1) A display control apparatus, including:
  a distortion correction selecting section that
    determines a display position that is a position, on a screen, at which an image of content is displayed,
    determines a viewer position that is a position of a viewer who views the image, and
    determines, according to the viewer position, transformation information used to correct the image such that a distortion in the image appears reduced to the viewer when the viewer views the image displayed at the display position on the screen; and
  a distortion correction processor that renders a correction image that is an image obtained by correcting the image using the transformation information to generate correction-image rendering data that is output to the display apparatus.

(2) The display control apparatus according to (1), in which
  the viewer position includes a position in a width direction of the screen and a position in a height direction of the screen.

(3) The display control apparatus according to (1) or (2), in which
  the distortion correction selecting section determines the viewer position on the basis of an attribute of the content.

(4) The display control apparatus according to any one of (1) to (3), in which
  the distortion correction selecting section determines the display position on the basis of an attribute of the content.

(5) The display control apparatus according to any one of (1) to (4), in which
  the transformation information is a parameter used to transform coordinates representing the display position for the image into coordinates representing a pixel of the display apparatus that is used to display the image at the display position, and
  the pieces of transformation information different from each other are respectively used correspondingly to the viewer positions of a plurality of the viewer positions different from each other.

(6) The display control apparatus according to any one of (1) to (5), in which
  the distortion correction selecting section determines the display position on the basis of viewpoint information regarding a viewpoint of the viewer, the viewpoint information indicating a position of eyes of the viewer and a position of the viewpoint of the viewer, the viewpoint information being acquired from a viewpoint information determining section that determines the viewpoint information.

(7) The display control apparatus according to (6), in which the viewpoint information determining section determines the pieces of viewpoint information regarding viewpoints of a plurality of candidates for the viewer, and the distortion correction selecting section determines the display position on the basis of the pieces of viewpoint information regarding the viewpoints of the plurality of candidates.

(8) The display control apparatus according to any one of (1) to (7), in which the distortion correction selecting section determines the viewer position on the basis of viewpoint information regarding a viewpoint of the viewer, the viewpoint information indicating a position of eyes of the viewer and a position of the viewpoint of the viewer, the viewpoint information being acquired from a viewpoint information determining section that determines the viewpoint information.

(9) The display control apparatus according to (8), in which the viewpoint information determining section determines the pieces of viewpoint information regarding viewpoints of a plurality of candidates for the viewer, and the distortion correction selecting section determines the viewer position on the basis of the pieces of viewpoint information regarding the viewpoints of the plurality of candidates.

(10) The display control apparatus according to any one of (1) to (9), in which the screen includes a freeform surface.

(11) The display control apparatus according to any one of (1) to (10), in which the screen is a windshield of a vehicle.

(12) The display control apparatus according to (11), in which the distortion correction selecting section determines, as the viewer position, a driver's seat of the vehicle, a passenger seat of the vehicle, or both the driver's seat and the passenger seat.

(13) The display control apparatus according to (11) or (12), in which the display apparatus is a projection apparatus that is capable of projecting the image onto an entire region of the windshield in a width direction of the windshield.

(14) A display control method, including:
determining a display position that is a position, on a screen, at which an image of content is displayed;
determining a viewer position that is a position of a viewer who views the image;
determining, according to the viewer position, transformation information used to correct the image such that a distortion in the image appears reduced to the viewer when the viewer views the image displayed at the display position on the screen; and
rendering a correction image that is an image obtained by correcting the image using the transformation information to generate correction-image rendering data that is output to the display apparatus.

(15) A non-transitory computer-readable recording medium that records therein a display control program that operates a control circuit of a display control apparatus as a distortion correction selecting section and a distortion correction processor, the distortion correction selecting section determining a display position that is a position, on a screen, at which an image of content is displayed, the distortion correction selecting section determining a viewer position that is a position of a viewer who views the image, the distortion correction selecting section determining, according to the viewer position, transformation information used to correct the image such that a distortion in the image appears reduced to the viewer when the viewer views the image displayed at the display position on the screen,
the distortion correction processor rendering a correction image that is an image obtained by correcting the image using the transformation information to generate correction-image rendering data that is output to the display apparatus.

(16) A display system, including:
a display apparatus that displays an image of content on a screen; and
a display control apparatus that includes
a distortion correction selecting section that
determines a display position that is a position, on a screen, at which the image of the content is displayed,
determines a viewer position that is a position of a viewer who views the image, and
determines, according to the viewer position, transformation information used to correct the image such that a distortion in the image appears reduced to the viewer when the viewer views the image displayed at the display position on the screen, and
a distortion correction processor that renders a correction image that is an image obtained by correcting the image using the transformation information to generate correction-image rendering data that is output to the display apparatus.

(17) A display control program that operates a control circuit of a display control apparatus as a distortion correction selecting section and a distortion correction processor,
the distortion correction selecting section determining a display position that is a position, on a screen, at which an image of content is displayed, the distortion correction selecting section determining a viewer position that is a position of a viewer who views the image, the distortion correction selecting section determining, according to the viewer position, transformation information used to correct the image such that a distortion in the image appears reduced to the viewer when the viewer views the image displayed at the display position on the screen,
the distortion correction processor rendering a correction image that is an image obtained by correcting the image using the transformation information to generate correction-image rendering data that is output to the display apparatus.

The embodiments and the modifications of the present technology have been described above. Of course the present technology is not limited to the embodiments described above, and various modifications may be made thereto without departing from the scope of the present technology.

REFERENCE SIGNS LIST 1, 2 display system
10 display control apparatus
110 distortion correction selecting section
111 display position determining section

112 transformation information determining section
113 transformation information storage
114 transformation information
120 distortion correction processor
121 image transformation section
130 output section
20 display apparatus
210 display device controller
220 display device
30 content generation system
40 viewpoint information determining section
41 vehicle interior monitoring camera

The invention claimed is:

1. A display control apparatus, comprising;
a distortion correction selecting circuit configured to:
determine a display position that is a position, on a screen, at which an image of content is displayed,
determine a viewer position that is a position of a viewer who views the image, wherein the viewer position is determined based on a display mode indicating a priority between plural seats, the plural seats including a driver's seat and a passenger seat, wherein, when the display mode indicates an equality mode between the driver's seat and the passenger seat, the viewer position is determined as a virtual intermediate position between the driver's seat and the passenger seat; and
determine, according to the viewer position, transformation information used to correct the image such that a distortion in the image appears reduced to the viewer when the viewer views the image displayed at the display position on the screen; and
a distortion correction processor configured to render a correction image that is an image obtained by correcting the image using the transformation information to generate correction-image rendering data that is output to the screen, wherein the image of the content displayed on the screen is viewable from plural seats.

2. The display control apparatus according to claim 1, wherein
the viewer position includes a position in a width direction of the screen and a position in a height direction of the screen.

3. The display control apparatus according to claim 1, wherein
the distortion correction selecting circuit is configured to determine the display position on a basis of an attribute of the content.

4. The display control apparatus according to claim 1, wherein
the transformation information is a parameter used to transform coordinates representing the display position for the image into coordinates representing a pixel of the screen that is used to display the image at the display position, and
the pieces of transformation information different from each other are respectively used correspondingly to the viewer positions of a plurality of the viewer positions different from each other.

5. The display control apparatus according to claim 1, wherein
the distortion correction selecting circuit is configured to determine the display position on a basis of viewpoint information regarding a viewpoint of the viewer, the viewpoint information indicating a position of eyes of the viewer and a position of the viewpoint of the viewer, the viewpoint information being acquired from a viewpoint information determining circuit configured to determine the viewpoint information.

6. The display control apparatus according to claim 5, wherein
the viewpoint information determining circuit is configured to determine the viewpoint information regarding viewpoints of a plurality of candidates for the viewer, and
the distortion correction selecting circuit is configured to determine the display position on a basis of viewpoint information regarding the viewpoints of the plurality of candidates.

7. The display control apparatus according to claim 1, wherein
the distortion correction selecting circuit is configured to determine the viewer position on a basis of viewpoint information regarding a viewpoint of the viewer, the viewpoint information indicating a position of eyes of the viewer and a position of the viewpoint of the viewer, the viewpoint information being acquired from a viewpoint information determining circuit configured to determine the viewpoint information.

8. The display control apparatus according to claim 7, wherein
the viewpoint information determining circuit is configured to determine the viewpoint information regarding viewpoints of a plurality of candidates for the viewer, and
the distortion correction selecting circuit is configured to determine the viewer position on a basis of viewpoint information regarding the viewpoints of the plurality of candidates.

9. The display control apparatus according to claim 1, wherein
the screen includes a freeform surface.

10. The display control apparatus according to claim 1, wherein
the screen is a windshield of a vehicle.

11. The display control apparatus according to claim 10, wherein
the distortion correction selecting circuit is configured to determine as the viewer position, a driver's seat of the vehicle, a passenger seat of the vehicle, or both the driver's seat and the passenger seat.

12. The display control apparatus according to claim 10, wherein
the screen is a projection apparatus that is capable of projecting the image onto an entire region of the windshield in a width direction of the windshield.

13. The display control apparatus according to claim 1, wherein display position determining circuit is further configured to determine a display position based on a display mode selected from a plurality of display modes.

14. The display control apparatus according to claim 13, wherein attributes of the content to be displayed is based on the display mode.

15. The display control apparatus according to claim 13, wherein a relative position of each image of content of a plurality of different images of content to be displayed is based on the display mode.

16. The display control apparatus according to claim 13, wherein a relative size of each image of content of a plurality of different images of content to be displayed is based on the display mode.

17. The display control apparatus according to claim 1, wherein the virtual intermediate position is a midpoint of a line segment connecting a position of eyes of a viewer in the driver's seat and a position of eyes of a viewer in the passenger seat.

18. A display control method, comprising:

determining a display position that is a position, on a screen, at which an image of content is displayed;

determining a viewer position that is a position of a viewer who views the image, wherein the viewer position is determined based on a display mode indicating a priority between plural seats, the plural seats including a driver's seat and a passenger seat, wherein, when the display mode indicates an equality mode between the driver's seat and the passenger seat, the viewer position is determined as a virtual intermediate position between the driver's seat and the passenger seat;

determining, according to the viewer position, transformation information used to correct the image such that a distortion in the image appears reduced to the viewer when the viewer views the image displayed at the display position on the screen; and rendering a correction image that is an image obtained by correcting the image using the transformation information to generate correction-image rendering data that is output to the screen, wherein the image of the content displayed on the screen is viewable from plural seats.

19. A non-transitory computer-readable recording medium that records therein a display control program that operates a control circuit of a display control apparatus as a distortion correction selecting circuit and a distortion correction processor, the distortion correction selecting circuit determining a display position that is a position, on a screen, at which an image of content is displayed, determining a viewer position that is a position of a viewer who views the image, wherein the viewer position is determined based on an attribute of the content and positions of plural seats and wherein the viewer position is determined as one of a driver's seat position, a passenger seat position, or a virtual intermediate position between the driver's seat and the passenger seat based on the attribute of the co, and determining, according to the viewer position, transformation information used to correct the image such that a distortion in the image appears reduced to the viewer when the viewer views the image displayed at the display position on the screen, the distortion correction processor rendering a correction image that is an image obtained by correcting the image using the transformation information to generate correction-image rendering data that is output to the screen, wherein the image of the content displayed on the screen is viewable from plural seats.

20. A display system, comprising:

a display apparatus that displays an image of content on a screen; and a display control apparatus that includes a distortion correction selecting circuit configured to:

determine a display position that is a position, on the screen, at which the image of the content is displayed, determine a viewer position that is a position of a viewer who views the image, wherein the viewer position is determined based on a display mode indicating a priority between plural seats, the plural seats including a driver's seat and a passenger seat, wherein, when the display mode indicates an equality mode between the driver's seat and the passenger seat, the viewer position is determined as a virtual intermediate position between the driver's seat and the passenger seat, and determine, according to the viewer position, transformation information used to correct the image such that a distortion in the image appears reduced to the viewer when the viewer views the image displayed at the display position on the screen, and a distortion correction processor configured to render a correction image that is an image obtained by correcting the image using the transformation information to generate correction-image rendering data that is output to the display apparatus, wherein the image of the content displayed on the screen is viewable from plural seats.

* * * * *